US009835933B2

(12) United States Patent
Araki et al.

(10) Patent No.: US 9,835,933 B2
(45) Date of Patent: Dec. 5, 2017

(54) CAMERA AND CAMERA ASSEMBLY (71) Applicant: Sony Computer Entertainment Inc., Tokyo (JP)

(72) Inventors: Takamasa Araki, Tokyo (JP); Manabu Ishioka, Tokyo (JP); Taichi Nokuo, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 16 days.

(21) Appl. No.: 14/765,932

(22) PCT Filed: Dec. 25, 2013

(86) PCT No.: PCT/JP2013/084590
§ 371 (c)(1),
(2) Date: Aug. 5, 2015

(87) PCT Pub. No.: WO2014/125743
PCT Pub. Date: Aug. 21, 2014

(65) Prior Publication Data
US 2015/0362826 A1 Dec. 17, 2015

(30) Foreign Application Priority Data

Feb. 18, 2013 (JP) .................................. 2013-029457

(51) Int. Cl.
*H04N 5/225* (2006.01)
*G03B 17/56* (2006.01)
(Continued)

(52) U.S. Cl.
CPC ........... *G03B 17/561* (2013.01); *F16M 11/10* (2013.01); *G03B 17/02* (2013.01); *G03B 29/00* (2013.01);
(Continued)

(58) Field of Classification Search
None
See application file for complete search history.

(56) References Cited

U.S. PATENT DOCUMENTS

| 6,141,052 A | 10/2000 | Fukumitsu |
| 7,470,071 B2 | 12/2008 | Ibaraki |

(Continued)

FOREIGN PATENT DOCUMENTS

| CN | 1521553 A | 8/2004 |
| CN | 101056507 A | 10/2007 |

(Continued)

OTHER PUBLICATIONS

International Search Report for corresponding PCT Application No. PCT/JP2013/084590, dated Apr. 1, 2014.

(Continued)

*Primary Examiner* — Stephen Coleman
(74) *Attorney, Agent, or Firm* — Matthew B. Dernier, Esq.

(57) ABSTRACT

A main body of a camera accommodates a light receiving part. The main body has a flat bottom surface. A support is aligned with the main body in a left-right direction, and supports the main body in such a manner that an orientation of the light receiving part can be controlled in a vertical direction. A bottom surface of the support is located on a common plane on which a bottom surface of the main body is also located. The bottom surface of the support can be attached to and detached from a stand member which is mounted to a display device. This camera promises enhanced stability of mounting of the camera to an edge of a display device.

10 Claims, 5 Drawing Sheets

(51) Int. Cl.
*G03B 35/08* (2006.01)
*G03B 29/00* (2006.01)
*H04N 13/02* (2006.01)
*F16M 11/10* (2006.01)
*G03B 17/02* (2006.01)
*G03B 31/00* (2006.01)

(52) U.S. Cl.
CPC ............. *G03B 31/00* (2013.01); *G03B 35/08* (2013.01); *H04N 5/2259* (2013.01); *H04N 13/0203* (2013.01); *H04N 13/0239* (2013.01)

(56) References Cited

U.S. PATENT DOCUMENTS

| | | | | |
|---|---|---|---|---|
| 2004/0004671 | A1* | 1/2004 | Takahashi | H04N 1/00204 348/375 |
| 2004/0207718 | A1* | 10/2004 | Boyden | H04N 7/144 348/14.01 |
| 2005/0052569 | A1* | 3/2005 | Ibaraki | H04N 5/2251 348/375 |
| 2007/0122141 | A1 | 5/2007 | Agevik | |
| 2010/0084529 | A1 | 4/2010 | Depay | |
| 2011/0193933 | A1* | 8/2011 | Ryu | H04N 7/147 348/14.08 |

FOREIGN PATENT DOCUMENTS

| | | |
|---|---|---|
| CN | 101191992 A | 6/2008 |
| CN | 101682714 A | 3/2010 |
| JP | 2004191411 A | 7/2004 |
| JP | 2006115543 A | 4/2006 |
| JP | 2008147734 A | 6/2008 |
| JP | 2010245691 A | 10/2010 |

OTHER PUBLICATIONS

Office Action for corresponding JP Patent Application No. 2014-536018, dated Jun. 2, 2015.
International Preliminary Report on Patent ability and Written Opinion for corresponding PCT Application No. PCT/JP2013/084590, 10 Pages, dated Aug. 27, 2015.
Search Report for corresponding EP Application No. 13874907.2, 6 pages, dated Aug. 22, 2016.
Search Report for corresponding EP Application No. 13874907.2, 6 Pages, dated Oct. 14, 2016.
Anonymous: Elektronik Vanguard PH-242 Mehrwegeneiger Multifunkionsbefestigung: Amazon.de: XP055295073, Retrieved from the Internet: URL:https:jjwww.amazon.de/Vanguard-PH-242-Mehrwegeneiger-Multifunkionsbefestigung-Schnellwechselplat-tejdp/B0051N9R3W 2, pages, May 19, 2011.
Anonymous: Hama Schnellkupplungsplatte 10-12 fUr Stative der Serien: Amazon.de: Kamer a, XP055308185, Retrieved from the Internet: URL:https:jjwww.amazon.de/Hama-Schnellkup-plungsplatte-Stative-4-Zoll-Gewinde-Schwarz/dp/B0080AIRXI, 6 pages, Jul. 7, 2003(Jul. 7, 2003).
Office Action for corresponding CN Application No. 201380072528.3, 26 pages, dated Jun. 2, 2017.

* cited by examiner

CAMERA AND CAMERA ASSEMBLY

TECHNICAL FIELD

The present invention relates to a camera that is mounted to an edge of a display device.

BACKGROUND ART

Heretofore, there has been utilized a camera which is mounted to an edge of a display device (for example, a TV set or a display of a personal computer) and in which an orientation of a light receiving part can be controlled in a vertical direction. A camera that is disclosed in Japanese Design Registration No. 1291736 is provided, at a position spaced downward from a main body accommodating a light receiving part, with a plate-shaped mounting part to be mounted to a display device.

SUMMARY

In the structure wherein the mounting part is provided at a position spaced downward from the main body as in the above-mentioned Patent Document 1, the position of the main body of the camera becomes high when the camera is used, which makes it difficult to secure stability of mounting.

A camera for solving the above-mentioned problem includes: a main body accommodating a light receiving part, the main body having a flat bottom surface; and a support which is aligned with the main body in a left-right direction, supports the main body so as to permit orientation of the light receiving part to be controlled in a vertical direction, and has a bottom surface located on a common plane whereon the bottom surface of the main body is also located, the bottom surface of the support being attachable to and detachable from a stand member mounted to a display device.

A camera assembly for solving the above-mentioned problem includes a camera and a stand member for mounting to a display device, wherein the camera includes: a main body accommodating a light receiving part, the main body having a flat bottom surface; and a support which is aligned with the main body in a left-right direction, supports the main body so as to permit orientation of the light receiving part to be controlled in a vertical direction, and has a bottom surface located on a common plane whereon the bottom surface of the main body is also located, the bottom surface of the support being attachable to and detachable from the stand member.

According to the camera and the camera assembly as above-mentioned, stability of mounting of the camera can be enhanced.

DESCRIPTION OF EMBODIMENT

Figure 1:
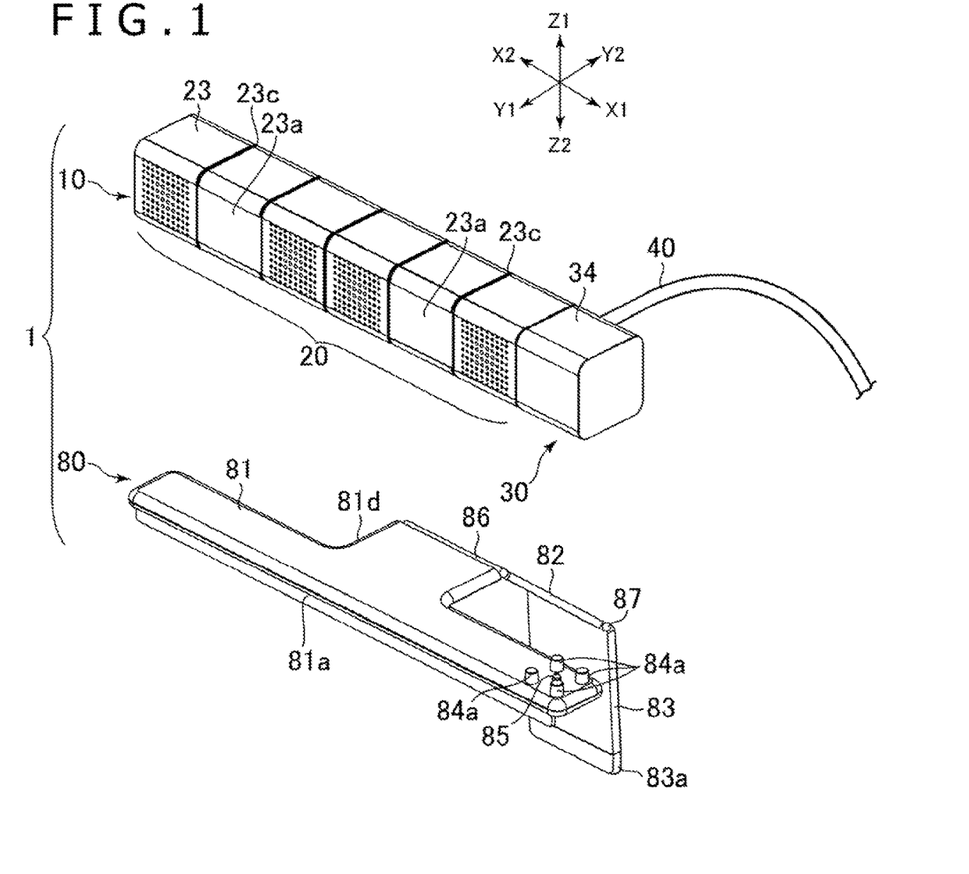
FIG. 1 is an exploded perspective view of a camera assembly according to one embodiment of the present invention.
Figure 2:
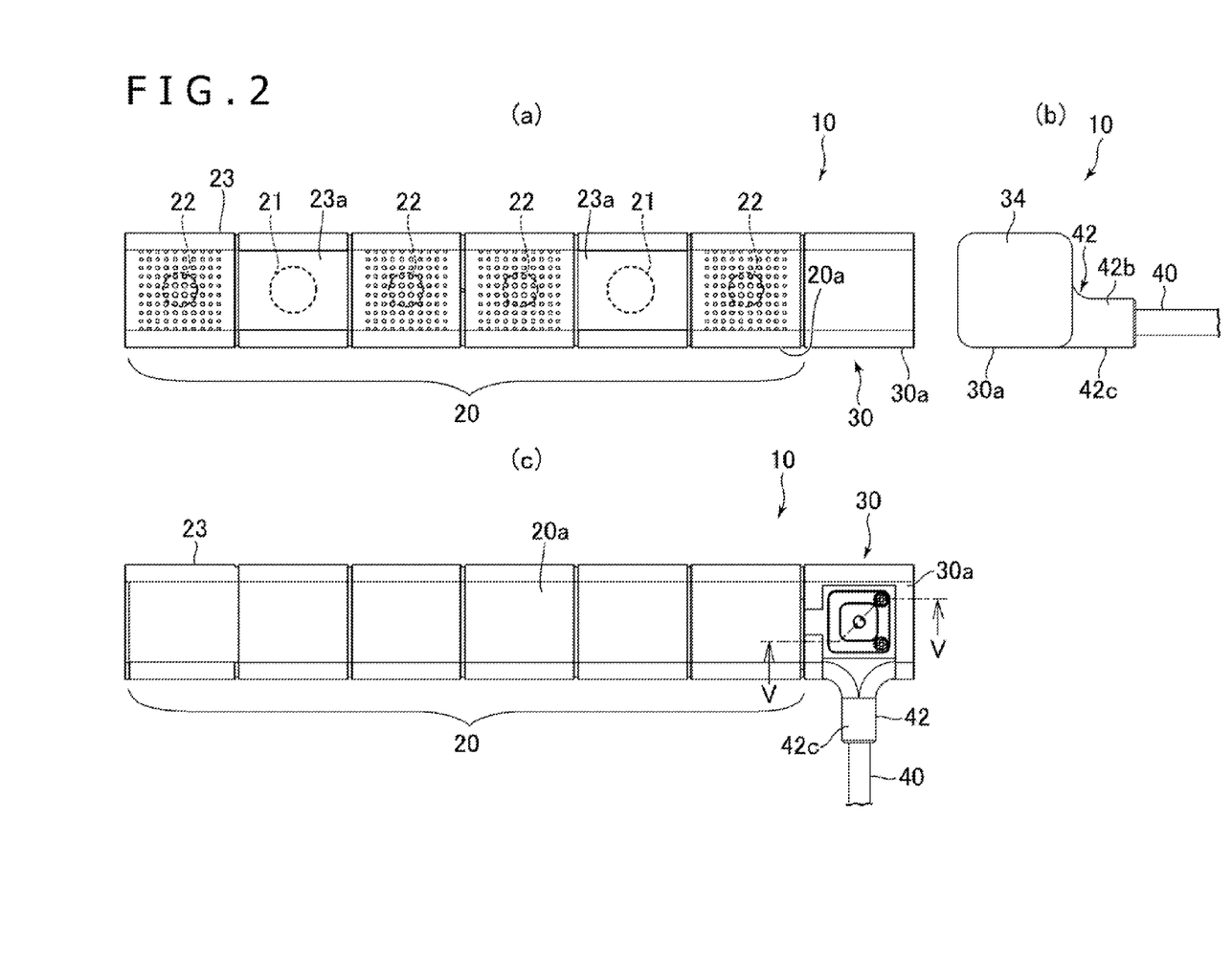
FIG. 2 illustrates a camera constituting the camera assembly, wherein (a) of the figure is a front view, (b) is a side view, and (c) is a lower view.
Figure 3:
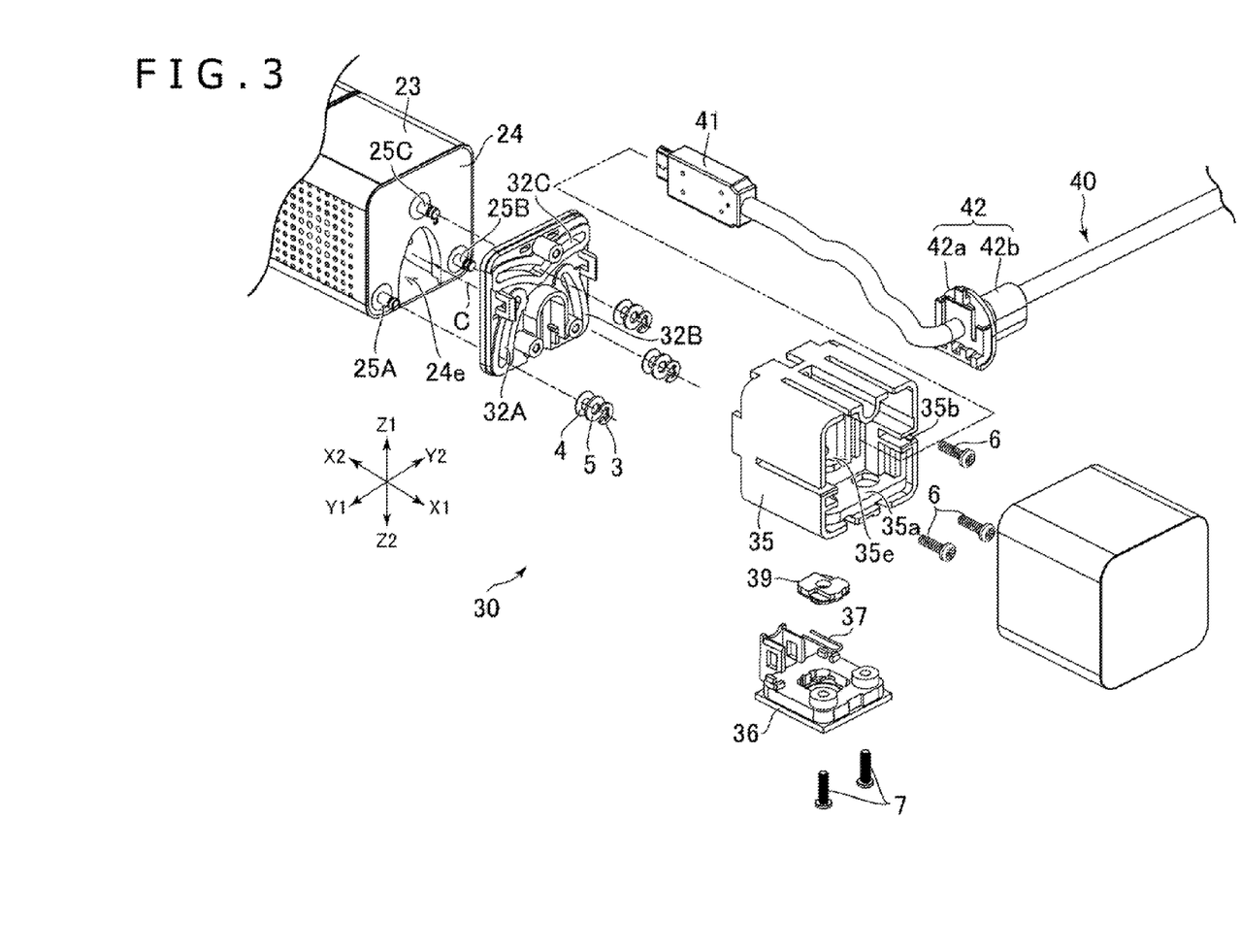
FIG. 3 is an exploded perspective view of a support possessed by the camera.
Figure 4:
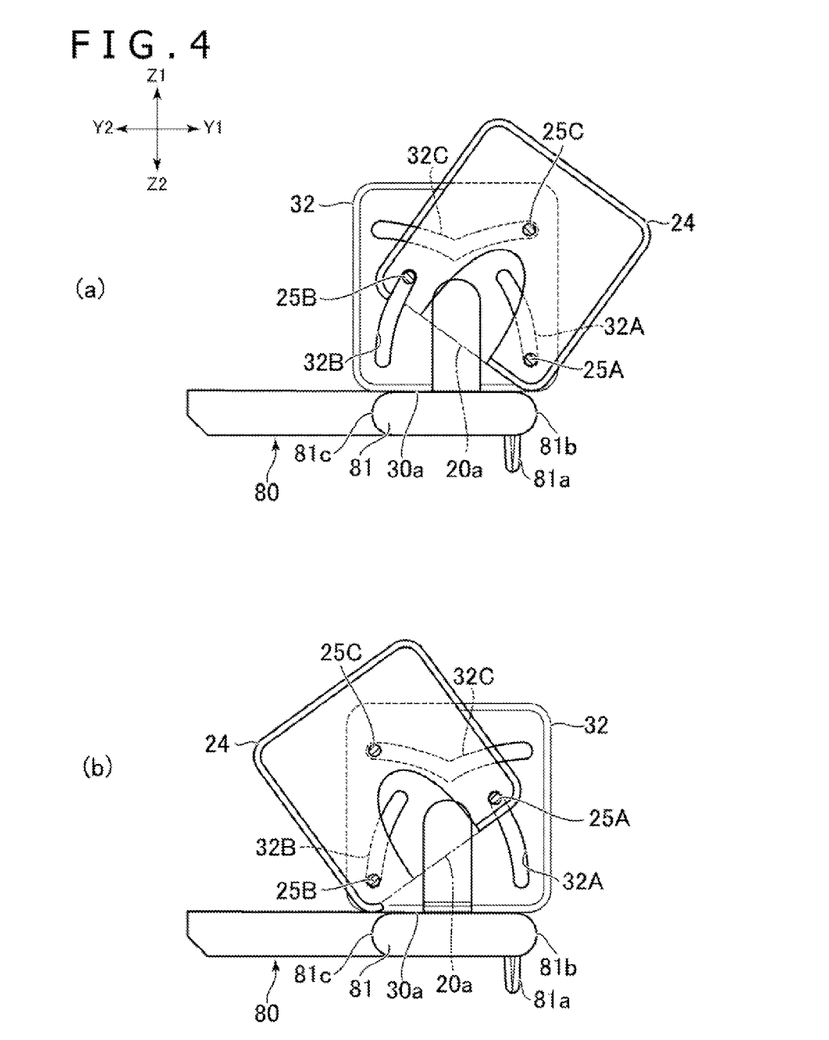
FIG. 4 is a figure for explaining motions of a main body relative to the support possessed by the camera.
Figure 5:
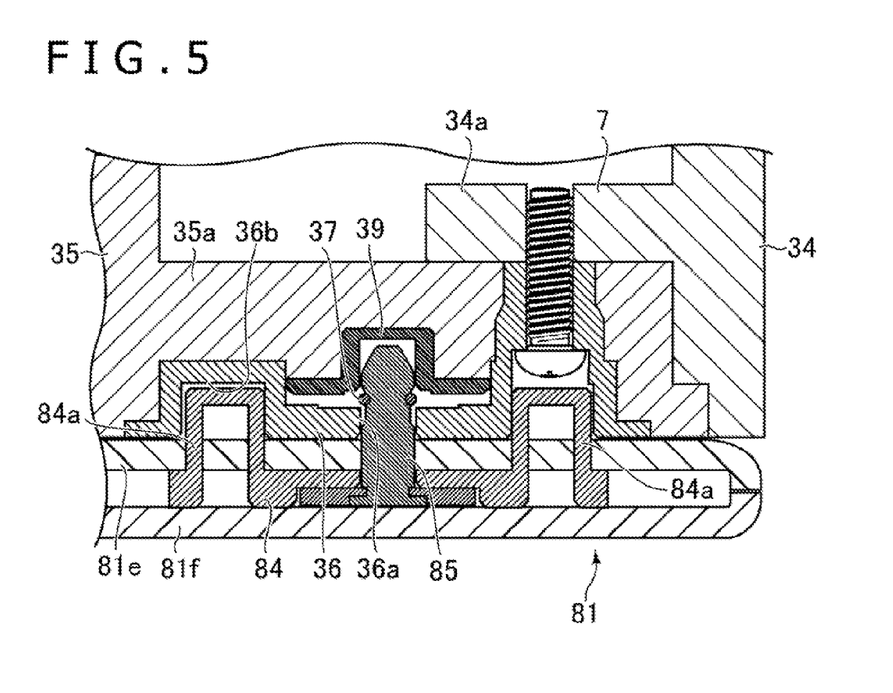
FIG. 5 is a sectional view taken along line V-V in FIG. 2(c).

Now, one embodiment of the present invention will be described below, referring to the drawings. FIG. 1 is an exploded perspective view of a camera assembly 1 according to one embodiment of the present invention. FIG. 2 illustrates a camera 10 constituting the camera assembly 1, wherein (a) of the figure is a front view, (b) is a side view, and (c) is a lower view. FIG. 3 is an exploded perspective view of a support 30 possessed by the camera 10. FIG. 4 is a figure for explaining motions of a main body 20 relative to the support 30 possessed by the camera 10. FIG. 5 is a sectional view taken along line V-V in FIG. 2(c).

In the following description, Y1 and Y2 shown in FIG. 1 are a forward direction (front side) and a rearward direction (rear side), respectively. In addition, X1 and X2 are a rightward direction (right side) and a leftward direction (left side), respectively. Besides, Z1 and Z2 are an upward direction (upper side) and a downward direction (lower side), respectively.

As shown in FIG. 1, the camera assembly 1 has a stand member 80 for supporting the camera 10 on an upper edge of a display device (a TV set or a display of a personal computer). The stand member 80 is mounted to an upper edge of the display device, and the camera 10 is mounted to a top surface of the stand member 80.

As shown in FIG. 2(a), the camera 10 has the main body 20 accommodating a light receiving part 21. The light receiving part 21 includes a lens module or a light receiving element. The camera 10 is connected through a cable 40 (see FIG. 1) to an information processing device such as a game device or a personal computer, and transmits image data acquired through the light receiving part 21 to the information processing device. In this example, the main body 20 has two light receiving parts 21 which are located to be spaced from each other along a left-right direction. In the information processing device, therefore, a three-dimensional image can be produced based on the image data acquired by the two light receiving parts 21. The number of the light receiving part or parts 21 is not limited to two, and may be one.

As shown in FIG. 2(a), the main body 20 has a microphone or microphones 22. The camera 10 transmits sound data acquired through the microphone or microphones 22 to the information processing device through the cable 40. The main body 20 in this example has a plurality of microphones 22 disposed at an interval or intervals along the left-right direction. In the information processing device, therefore, a position of a sound source can be calculated based on the sound data acquired through the plurality of microphones 22. The plurality of microphones 22 are aligned in the left-right direction, together with the two light receiving parts 21. In this example, the main body 20 has four microphones 22. Two microphones 22 are disposed between the two light receiving parts 21. This enables effective utilization of a space between the two light receiving parts 21. In addition, two microphones 22 are disposed on the outside of the two light receiving parts 21. Specifically, the microphones 22 are disposed respectively on the right side of the right-hand light receiving part 21 and on the left side of the left-hand light receiving part 21. This secures a long distance between the two microphones 22 disposed on the outside of the two light receiving parts 21, so that accuracy in calculation of the position of the sound source can be enhanced.

The layout of the microphones 22 is not limited to the above-described one. For example, the four microphones 4 may all be disposed on the outside of the two light receiving parts 21. In addition, a configuration may be adopted wherein the main body 20 has three microphones 22, and one of the microphones 22 is disposed between the two light receiving parts 21. Furthermore, the main body 20 may have only two microphones 22. In this case, the microphones 22 may be disposed only on the outside of the two light receiving parts 21. Besides, the microphones 22 may be disposed only between the two light receiving parts 21.

As shown in FIG. 2(a), the camera 10 has the support 30 aligned with the main body 20 in the left-right direction. In this example, the support 30 is disposed on the right side of the main body 20. In other words, the support 30 is located at an end portion (in this example, a right end portion) of the camera 10. The main body 20 is supported by the support 30 so that the orientation (the direction of an optical axis) of the light receiving parts 21 can be controlled in a vertical direction. The main body 20 has a flat bottom surface 20a. A bottom surface 30a of the support 30 can be attached to and detached from the stand member 80. The bottom surface 30a of the support 30 is located on a common plane on which the bottom surface 20a of the main body 20 is also located. This structure of the camera 10 ensures that the position of the main body 20 can be set low, and it is easy to secure stability of mounting of the camera 10. A support structure for supporting the main body 20 by the support 30 and a mounting structure for mounting the support 30 onto the stand member 80 will be described in detail later.

The support 30 and the main body 20 are so formed that they are the same in sectional profile. The section here is a section that is orthogonal to the left-right direction. In this example, the main body 20 and the support 30 are substantially in the shape of a rectangular parallelepiped elongated in the left-right direction, as a whole. Of a right-hand portion and a left-hand portion of the rectangular parallelepiped, one (in this example, the left-hand portion) is the main body 20, and the other (in this example, the right-hand portion) is the support 30. Therefore, the sectional profile of the support 30 and the sectional profile of the main body 20 are both rectangles. With the shapes of the main body 20 and the support 30 set in this way, it is easy to house the camera 10 or pack the camera 10, for example, when the camera 10 is not in use. The above-mentioned two light receiving parts 21 and microphones are aligned on a plane perpendicular to the bottom surface 20a of the main body 20. More in detail, the main body 20 includes a circuit board (not shown) disposed in parallel to a front surface and a rear surface of the main body 20 and perpendicularly to the bottom surface 20a of the main body 20. The light receiving parts 21 and the microphones 22 are mounted on the circuit board. Since the main body 20 is substantially in the shape of a rectangular parallelepiped, component parts and the circuit board can be laid out therein easily. It is to be noted that the shapes of the support 30 and the main body 20 are not limited to the above-described ones. For instance, the support 30 and the main body 20 may be so shaped that they are roughly semicircular in sectional profile.

As shown in FIG. 3, the main body 20 in this example has a case 23 and a side plate 24. The case 23 constitutes a front surface, a top surface, a rear surface, and a bottom surface of the main body 20, whereas the side plate 24 constitutes a side surface of the main body 20 that opposes the support 30 in the left-right direction. The above-mentioned light receiving parts 21 and microphones 22 are housed in a housing that includes the case 23 and the side plate 24. The front surface of the case 23 is formed therein with sound passing holes 23b permitting passage of sounds therethrough toward the microphones 22 (see FIG. 1). In addition, the case 23 is provided at its front surface with front panels 23a which are located in positions corresponding to the light receiving parts 21 and which are formed of a light-transmitting material.

As shown in FIG. 1, the case 23 is formed with a plurality of grooves 23c aligned at regular intervals along the left-right direction. The microphones 22 and the light receiving parts 21 are each disposed in a space between two adjacent grooves 23c. The support 30 in this example has a width approximately equal to the interval between the two adjacent grooves 23c. This makes it possible to restrain the support 30 from becoming conspicuous, and thereby to enhance an appearance quality of the camera 10.

As aforementioned, the support 30 supports the main body 20 in such a manner that the orientation of the light receiving parts 21 can be controlled in a vertical direction. In other words, the main body 20 is linked to the support 30 in such a manner that a tilt angle of the main body 20 can be controlled. In this example, the main body 20 is so supported that its bottom surface 20a is raised when the main body 20 is moved from its neutral position so as to cause a change in the orientation of the light receiving parts 21. Therefore, when the main body 20 is moved from its neutral position in the condition where the camera 10 is mounted on the stand member 80, its bottom surface 20a is separated from the top surface of the stand member 80. This structure ensures that the clearance between the main body in its neutral position and the stand member 80 can be reduced. As a result, it becomes easier to secure stability of mounting of the camera 10. It is to be noted that the "neutral position" refers to the position of the main body 20 in the condition where the bottom surface 20a of the main body 20 and the bottom surface 30a of the support 30 are on the same plane as shown in FIG. 2(a). When the main body 20 is in its neutral position, its bottom surface 20a is parallel to the top surface of the stand member 80.

The support structure for supporting the main body 20 by the support 30 will be described in detail. As shown in FIG. 3, a front hinge shaft 25A and a rear hinge shaft 25B are provided at the side plate 24 of the main body 20. The support 30 and the main body 20 are linked to each other in the left-right direction by the hinge shafts 25A and 25B. In this example, the hinge shafts 25A and 25B are inserted into holes formed in the side plate 24, from the inner side of the side plate 24, to protrude toward the outer side of the side plate 24. The support 30 has a guide plate 32 opposing the side plate 24. The guide plate 32 is formed therein with a front guide hole 32A and a rear guide hole 32B in which the front hinge shaft 25A and the rear hinge shaft 25B are fitted, respectively.

The front hinge shaft 25A is provided in a position deviated forward and downward from a center line C of the main body 20 that extends along the left-right direction. The rear hinge shaft 25B is provided in a position deviated rearward and downward from the center line C. In other words, the two hinge shafts 25A and 25B are provided at a lower-side portion of the side plate 24, and are located to be spaced from each other in the front-rear direction. In this example, the front hinge shaft 25A and the rear hinge shaft 25B are provided respectively at corner portions of the lower-side portion of the side plate 24. The front hinge shaft 25A is provided in a front-side corner, while the rear hinge shaft 25B is provided in a rear-side corner.

FIG. 4 is a figure for explaining motions of the main body 20 relative to the support 30. In this figure, the side plate 24 and the guide plate 32 of the support 30 are illustrated. As shown in FIG. 4(a), the main body 20 is rotated about the front hinge shaft 25A when tilted forward from its neutral position so that the orientation of the light receiving parts 21 becomes obliquely downward. As a result, the bottom surface 20a of the main body 20 is raised. When the main body is thus tilted forward, the front hinge shaft 25A is supported at a lower end of the front guide hole 32A. As shown in FIG. 4(b), the main body 20 is rotated about the rear hinge shaft 25B when tilted rearward so that the orientation of the light receiving parts 21 becomes obliquely downward. As a result, in this case also, the bottom surface 20a of the main body 20 is raised. When the main body 20 is tilted rearward from its neutral position, the rear hinge shaft 25B is supported at a lower end of the rear guide hole 32B.

As shown in FIG. 4(b), the front guide hole 32A is so formed as to permit a motion of the front hinge shaft 25A when the main body 20 is tilted rearward from its neutral position. To be more specific, the front guide hole 32A is formed in the shape of an arc of a circle with a center on the rear hinge shaft 25B, in conformity with an orbital path of the front hinge shaft 25A in this instance. On the other hand, the rear guide hole 32B is so formed as to permit a motion of the rear hinge shaft 25B when the main body 20 is tilted forward from its neutral position, as shown in FIG. 4(a). To be more specific, the rear guide hole 32B is formed in the shape of an arc of a circle with a center on the front hinge shaft 25A, in conformity with an orbital path of the rear hinge shaft 25B in this instance. When the main body 20 is in its neutral position, the front hinge shaft 25A and the rear hinge shaft 25B are located at the lower end of the front guide hole 32A and the lower end of the rear guide hole 32B, respectively.

An upper end of the front guide hole 32A and an upper end of the rear guide hole 32B function as stoppers for determining tilt angle upper limits for the main body 20. Specifically, the orientation of the light receiving parts 21 can be tilted upward until the front hinge shaft 25A abuts on the upper end of the front guide hole 32A, as shown in FIG. 4(b). In addition, the orientation of the light receiving parts 21 can be tilted downward until the rear hinge shaft 25B abuts on the upper end of the rear guide hole 32B, as shown in FIG. 4(a).

The shapes of the guide holes 32A and 32B are not necessarily be limited to the arcuate shapes, insofar as the guide holes 32A and 32B have lower ends for supporting the hinge shafts 25A and 25B and upper ends for restricting the motions of the hinge shafts 25A and 25B and their shapes permit movements of the hinge shafts 25A and 25B. For instance, the guide plate 32 may be formed with a single large hole ranging from the front guide hole 32A to the rear guide hole 32B. In addition, an inner peripheral surface of the front guide hole 32A includes a surface located inwardly of the orbital path of the front hinge shaft 25A and a surface located outwardly of the orbital path of the front hinge shaft 25A. However, of these two surfaces, either one (for example, the surface located outwardly of the orbital path) may not necessarily be along the orbital path of the front hinge shaft 25A. Besides, the guide plate 32 may not necessarily be formed with a surface located outwardly of the orbital path of the front hinge shaft 25A. Similarly, an inner peripheral surface of the rear guide hole 32B includes a surface located inwardly of the orbital path of the rear hinge shaft 25B and a surface located outwardly of the orbital path of the rear hinge shaft 25B. However, of these two surfaces, either one (for example, the surface located outwardly of the orbital path) may not necessarily be along the orbital path of the rear hinge shaft 25B. In addition, the guide plate 32 may not necessarily be formed with a surface located outwardly of the orbital path of the rear hinge shaft 25B.

As above-mentioned, the hinge shafts 25A and 25B in this example protrude from the inner side toward the outer side of the side plate 24, and are fitted respectively in the guide holes 32A and 32B of the guide plate 32. To end portions of the hinge shafts 25A and 25B are attached slip-off preventive members (e.g., E-rings) 3 for preventing these shafts from slipping off from the guide holes 32A and 32B. In addition, to the end portions of the hinge shafts 25A and 25B are mounted washers 4 and elastic members (in this example, spring washers) 5 for pressing the washers 4 against edges of the guide holes 32A and 32B, respectively. This results in generation of frictional forces between the washers 4 and the edges of the guide holes 32A and 32B. Owing to these frictional forces, the main body 20 can be held at an arbitrary tilt angle.

As shown in FIG. 3, a guided shaft 25C is provided at the side plate 24, in addition to the hinge shafts 25A and 25B. In this example, like the hinge shafts 25A and 25B, the guided shaft 25C is inserted into a hole formed in the side plate 24, from the inner side of the side plate 24, to protrude toward the outer side of the side plate 24. The guided shaft 25C is provided at an upper-side portion of the side plate 24, contrary to the hinge shafts 25A and 25B. In addition, the guided shaft 25C is located at a position equidistant from the front hinge shaft 25A and from the rear hinge shaft 25B. The guide plate 32 is formed with a guide hole 32C in which the guided shaft 25C is to be fitted. The guide hole 32C is formed in conformity with an orbital path of the guided shaft 25C at the time of rotation of the main body 20. Specifically, in conformity with an orbital path of the guided shaft 25C at the time of forward tilting of the main body 20 as shown in FIG. 4(a) and an orbital path of the guided shaft 25C at the time of rearward tilting of the main body 20 as shown in FIG. 4(b), the guide hole 32C has a shape obtained by joining together an arc of a circle with a center on the front hinge shaft 25A and an arc of a circle with a center on the rear hinge shaft 25B. Owing to the guided shaft 25C and the guide hole 32C, it is possible to restrain a gap from being generated between the side plate 24 and the guide plate 32. When the main body 20 is in its neutral position, the guided shaft 25C is located in the center of the guide hole 32C, namely, in a joining position where the arc of the circle with the center on the front hinge shaft 25A and the arc of the circle with the center on the rear hinge shaft 25B join.

It is to be noted that to an end portion of the guided shaft 25C is attached a slip-off preventive member (e.g., E-ring) 3 for preventing this shaft from slipping off from the guide hole 32C, like in the case of the hinge shafts 25A and 25B. In addition, to the end portion of the guided shaft 25C are mounted a washer 4 and an elastic member 5 for pressing the washer 4 to an end of the guide hole 32C.

It is to be noted that the direction of insertion of the hinge shafts 25A and 25B and the guided shaft 25C may be opposite to the aforementioned direction. In other words, the hinge shafts 25A and 25B and the guided shaft 25C may be passed through the guide holes 32A, 32B, and 32C from the inside of the support 30, to protrude to the outside of the support 30, and be fixed into holes in the side plate 24.

As shown in FIG. 3, in addition to the guide plate 32, the support 30 also has a case 34 constituting an outside surface of the support 30, and a frame 35 which is disposed inside the case 34 and to which the guide plate 32 is mounted. The guide plate 32 and the frame 35 are fixed to each other by a plurality of screws 6. The above-mentioned slip-off preventive members 3, washers 4, and elastic members 5 are disposed between the guide plate 32 and the frame 35.

As aforementioned, the bottom surface 30a of the support is attachable to and detachable from the stand member 80. Specifically, one of the bottom surface 30a of the support 30 and the top surface of the stand member 80 is provided with an engaging part projecting toward the other. In addition, the other is provided with an engaged part composed of a hole or recess in which the engaging part is fitted. The engaging part is held in the state of being fitted in the engaged part.

In the example shown in FIGS. 1 and 5, the stand member 80 is provided with an engaging shaft 85, as the above-mentioned engaging part. The support 30 has a bottom plate 36 at a bottom portion thereof. The bottom plate 36 is formed with an engaged hole 36a, as the above-mentioned engaged part, and the engaging shaft 85 is fitted in the engaged hole 36a. In addition, the support 30 has a roughly U-shaped holding pin 37 on the bottom plate 36 (on the inner side of the bottom plate 36). The engaging shaft 85 is formed with a groove in an outer peripheral surface thereof, and the holding pin 37 elastically holds the grooved portion. In the condition where the engaging shaft 85 is held by the holding pin 37, the bottom surface 30a of the support 30 is in contact with the top surface of the stand member 80. With the holding pin 37 elastically deformed to expand (open wider), the engaging shaft 85 can be fitted into the inside of the holding pin 37 or be disengaged from the holding pin 37. The support 30 has a holding plate 39 for fixing the holding pin 37 to the bottom plate 36.

One of the bottom surface 30a of the support 30 and the top surface of the stand member 80 is provided with a plurality of positioning projections projecting toward the other. In this example, as shown in FIGS. 1 and 5, the stand member 80 is provided with a plurality of (in the example described here, four) positioning projections 84a. These positioning projections 84a are so arranged as to surround the engaging shaft 85. The bottom plate 36 of the support 30 is formed with a recess 36b in which the positioning projections 84a are to be fitted. The recess 36b described here is a rectangular groove (see FIG. 2(c)) joining positions which correspond respectively to the four positioning projections 84a. The positioning projections 84a are located at corner portions of the recess 36b. This ensures that clockwise or counterclockwise rotation of the camera 10 relative to the stand member 80 and movements of the camera 10 in the front-rear direction relative to the stand member 80 are restrained by the positioning projections 84a and the recess 36b.

As shown in FIGS. 3 and 5, the bottom plate 36 is mounted to a bottom surface of the frame 35. In this example, a plurality of (in this example, two) screws 7 are inserted into the bottom plate 36 from below. The screws 7 protrude upward beyond a lower wall portion 35a of the frame 35. The case 34 and the frame 35 are fitted to each other in the left-right direction. The case 34 has a mounting portion 34a located on the lower wall portion 35a. The screws 7 are engaged into threaded holes formed in the mounting portion 34a. This ensures that the frame 35, the bottom plate 36, and the case 34 are fixed to one another by the screws 7.

As shown in FIG. 3, the camera 10 has the cable 40. The cable 40 has a connector 41 at one end thereof. The connector is housed in the main body 20, and is connected to a connector provided on the circuit board inside the main body 20. The side plate 24, the guide plate 32, and the frame 35 are formed respectively with holes 24e, 32e, and 35e piercing them in the left-right direction. The cable 40 extends from the connector 41 toward the outer side (in this example, the right side) in the left-right direction while passing through the holes 24e, 32e, and 35e. Thereafter, the cable 40 extends rearward from the support 30.

As shown in FIG. 3, the cable 40 is provided with a bush at a position spaced from the connector 41. The bush 42 includes a plate-shaped front portion 42a disposed inside the frame 35, and a rear portion 42b (see FIG. 2(b)) which is located on the rear side of the support 30 and which contacts the rear surface of the support 30. As shown in FIG. 2(b), a bottom surface 42c of the rear portion 42b is located on the common plane on which the bottom surface 30a of the support 30 and the bottom surface 20a of the main body 20 are also located. Therefore, stability of mounting of the camera 10 can be further enhanced. As shown in FIG. 3, a rear wall portion of the frame is formed with a groove 35b. A portion between the front portion 42a and the rear portion 42b is held inside the groove 35b.

The stand member 80 will be described. As shown in FIG. 1, the stand member 80 has a support plate 81 on which to mount the camera 10. The support plate 81 is disposed at an upper edge of a display device. A front edge 81b of the support plate 81 is located rearwardly of the front surface of the camera 10 (see FIG. 4). This securely restrains the main body 20 of the camera 10 and the support plate 81 from interfering with each other when the main body 20 is tilted forward. Similarly, a rear edge 81c of the support plate 81 is located forwardly of the rear surface of the camera 10.

The support plate 81 has a flat top surface. A width in the left-right direction of the support plate 81 in this example is corresponding to a width of the camera 10 in the left-right direction. More in detail, the support plate 81 has the width equal to the width of the camera 10 in the left-right direction. Accordingly, the top surface of the support plate 81 has a portion to which to mount the bottom surface 30a of the support 30 of the camera 10, and a portion on which to mount the main body 20 of the camera 10. Such a shape of the support plate 81 ensures that the camera 10 can be supported in a stable manner.

In this example, at an end portion (in this example, a right end portion) of the top surface of the support plate 81 are provided the aforementioned engaging shaft 85 and positioning projections 84a. It is to be noted that as shown in FIG. 5, the support plate 81 in this example includes an upper case 81e constituting an upper-side portion thereof and a lower case 81f constituting a lower-side portion thereof. A plate 84, which has the positioning projections 84a, and the engaging shaft 85 are disposed between these two cases 81e and 81f. The positioning projections 84a and the engaging shaft 85 protrude upward via holes formed in the upper case 81e.

As shown in FIG. 1, the support plate 81 has at a central portion thereof an extension part 81d extending rearward. The stand member 80 has a first movable plate 82 linked to a rear edge of the extension part 81d, and a second movable plate 83 linked to a rear edge of the first movable plate 82. The extension part 81d and the first movable plate 82 are linked to each other by a hinge 86. The first movable plate 82 and the second movable plate 83 are linked to each other by a hinge 87.

The support plate 81 is formed at its front edge with a hook 81a projecting downward. When the stand member 80 is in use, the hook 81a is caught on the front side of the upper edge of a display device. The first movable plate 82 and the second movable plate 83 can as a whole be bent downward, as shown in FIG. 1. A rear edge (lower edge) of the second movable plate 83 makes contact with a rear surface of the display device. In other words, the stand member 80 is mounted to the display device in a state in which the display device is clamped between the hook 81a and the rear edge of the second movable plate 83. Preferably, an anti-slip member 83a formed of rubber or the like may be provided at the rear edge of the second movable plate 83.

It is to be noted that the present invention is not limited to the aforementioned camera 10 and camera assembly 1, and various modifications are possible.

For instance, the camera 10 may include two main bodies in which two light receiving parts 21 are housed respectively. In this case, a support 30 may be disposed between the two main bodies 20.

In addition, the camera 10 may have only one hinge shaft. In this case, the side plate 24 and the guide plate 32 may support the hinge shaft in such a manner that the hinge shaft can be vertically moved when the main body 20 is moved to cause the orientation of the light receiving parts 21 to be changed in a vertical direction. This eliminates the need to secure, between the main body 20 in its neutral position and the stand member 80, a clearance for allowing for rotation of the main body 20. As a result, stability of mounting the main body 20 can be enhanced.

Besides, the guided shaft 25C and the guide hole 32C corresponding thereto may not necessarily be provided.

The invention claimed is:

1. A camera comprising:
a main body accommodating a light receiving part, the main body having a flat bottom surface and a center-line extending in a left-right direction when viewing a front of the main body;
a support which is aligned with the main body in the left-right direction, supports the main body so as to permit orientation of the light receiving part to be controlled in a vertical direction, and has a bottom surface located on a common plane whereon the bottom surface of the main body rests;
a first shaft extending in the left-right direction and parallel to the center-line of the main body, the first shaft being located downward from, and offset in a first direction from, the center-line of the main body, and the first shaft operating to support and permit the main body to rotate about the first shaft and tilt in the first direction, which is one of a forward direction and a rearward direction; and
a second shaft extending in the left-right direction and parallel to the center-line of the main body, the second shaft being located downward from, and offset in a second direction from, the center-line of the main body, and the second shaft operating to support and permit the main body to rotate about the second shaft and tilt in the second direction, which is the other of the forward direction and the rearward direction.

2. The camera according to claim 1, wherein
the support is so formed as to permit a motion of the second shaft at the time of tilting of the main body in the first direction and to permit a motion of the first shaft at the time of tilting of the main body in the second direction.

3. The camera according to claim 1, wherein
the main body and the support are formed in a rectangular parallelepiped shape as a whole; and
the main body has two light receiving parts aligned on a plane perpendicular to the bottom surface thereof.

4. The camera according to claim 1, wherein the bottom surface of the support is attachable to and detachable from a stand member mounted to a display device.

5. The camera according to claim 1, wherein the main body has two light receiving parts and at least one microphone disposed between the two light receiving parts.

6. The camera according to claim 5, wherein the main body has a microphone disposed on a right side of the two light receiving parts, and a microphone disposed on a left side of the two light receiving parts.

7. A camera assembly comprising:
a camera; and
a stand member for mounting to a display device,
wherein the camera includes
a main body accommodating a light receiving part, the main body having a flat bottom surface and a center-line extending in a left-right direction when viewing a front of the main body;
a support which is aligned with the main body in the left-right direction, supports the main body so as to permit orientation of the light receiving part to be controlled in a vertical direction, and has a bottom surface located on a common plane whereon the bottom surface of the main body rests;
a first shaft extending in the left-right direction and parallel to the center-line of the main body, the first shaft being located downward from, and offset in a first direction from, the center-line of the main body, and the first shaft operating to support and permit the main body to rotate about the first shaft and tilt in the first direction, which is one of a forward direction and a rearward direction; and
a second shaft extending in the left-right direction and parallel to the center-line of the main body, the second shaft being located downward from, and offset in a second direction from, the center-line of the main body, and the second shaft operating to support and permit the main body to rotate about the second shaft and tilt in the second direction, which is the other of the forward direction and the rearward direction.

8. A stand member for supporting a camera, the camera including a main body accommodating a light receiving part, the main body having a flat bottom surface and a center-line extending in a left-right direction when viewing a front of the main body; and a main body accommodating a light receiving part, the main body having a flat bottom surface and a center-line extending in a left-right direction when viewing a front of the main body; a support which is aligned with the main body in the left-right direction, supports the main body so as to permit orientation of the light receiving part to be controlled in a vertical direction, and has a bottom surface located on a common plane whereon the bottom surface of the main body rests; a first shaft extending in the left-right direction and parallel to the center-line of the main body, the first shaft being located downward from, and offset in a first direction from, the center-line of the main body, and the first shaft operating to support and permit the main body to rotate about the first shaft and tilt in the first direction, which is one of a forward direction and a rearward direction; and a second shaft extending in the left-right direction and parallel to the center-line of the main body, the second shaft being located downward from, and offset in a second direction from, the center-line of the main body, and the second shaft operating to support and permit the main body to rotate about the second shaft and tilt in the second direction, which is the other of the forward direction and the rearward direction, the stand member comprising:

a support plate having a portion on which to mount the main body of the camera; and    an engaging part which is provided on the support plate, is fitted to an engaged part formed at a bottom surface of the support of the camera, and is elastically held in the engaged part.

9. The stand member according to claim 8, wherein the support plate is provided with a plurality of positioning projections which are fitted respectively in a plurality of recesses formed in the bottom surface of the support of the camera.

10. The stand member according to claim 8, further comprising:

a hook formed along a front edge of the portion for supporting the main body of the camera; and    a movable part for clamping an edge of a display device in cooperation with the hook, the movable part extending rearward from the portion for supporting the main body of the camera.

\* \* \* \* \*